United States Patent [11] 3,603,567

[72] Inventor Walter J. Sackett, Sr.
 Baltimore, Md.
[21] Appl. No. 13,310
[22] Filed Feb. 24, 1970
[45] Patented Sept. 7, 1971
[73] Assignee The A. J. Sackett & Sons Company
 Baltimore, Md.

[54] HIGH SPEED BLENDING AND LOADING SYSTEM
 11 Claims, 9 Drawing Figs.
[52] U.S. Cl. ........................................................ 259/180,
 259/4, 259/154
[51] Int. Cl. ....................................................... B01f 5/00
[50] Field of Search............................................ 259/180,
 150, 154, 4, 18, 36

[56] References Cited
UNITED STATES PATENTS

| | | | |
|---|---|---|---|
| 2,486,200 | 10/1949 | Connor ........................ | 259/180 |
| 3,078,076 | 2/1963 | Ferguson ...................... | 259/180 |
| 3,155,377 | 11/1964 | Godman ....................... | 259/180 |
| 3,259,375 | 7/1966 | Sackett ......................... | 259/180 |
| 3,337,190 | 8/1967 | Dettmer ........................ | 259/180 X |

Primary Examiner—Robert W. Jenkins
Attorney—Walter G. Finch

ABSTRACT: A high speed blending, weighing, and loading system is provided for handling and processing of materials having two or more ingredients. This system includes a primary weigh-blend hopper having a chute for receiving materials which, if necessary, are conditioned by breaking up of lumps of material in the chute and then passed on to the primary weigh-blend hopper for weighing and blending thereof.

HIGH SPEED BLENDING AND LOADING SYSTEM

This weigh-blend hopper is formed of two identical gates or doors which make up the sides and bottom of the hopper. The hopper is provided with spaced partitions to cause a vertical layering of materials. The materials are sequentially weighed as they are loaded into the weigh-blend hopper, the gates are then opened, and the materials are blended and mixed by gravity as they fall to a conveyor system located below the primary weigh-blend hopper.

The blended materials are then conveyed by a conveyor system to a second stage blending and holding hopper, where the blended materials are further blended, and then further processed by loading into trucks, by bagging, or by further processing, as desired, by a belt conveyor system which moves the blended materials to a predetermined station for further handling.

This invention relates generally to a materials handling and processing system, and more particularly it pertains to a high speed blending and loading system for processing of materials, such as plant foods, seeds, or the like.

It is an object of this invention to provide a high speed blending and loading system for raw materials which has a substantially higher output because of the elimination of conventional mixing time and a novel arrangement for blending of the raw materials.

Still another object of this invention is to provide a unique two-stage blending system in which better blends of raw materials are obtained because the blending is accomplished by gravity, thus minimizing power requirements.

And still another object of this invention is to provide a high speed blending and loading system in which fast thorough blends of raw materials are accomplished through the use of a minimum of labor.

And another object of this invention is to provide a high speed blending and loading system that is flexible in that a built-in holding hopper is provided in the system so that two batches of material can be handled simultaneously.

Another object of this invention is to provide a novel high speed blending, weighing, and loading system for handling and processing of material ingredients.

To provide a high speed blending and loading system for materials which utilizes a low profile of a primary weigh-blend hopper, is another object of this invention.

To provide a high speed blending and loading system which has a constant volume of delivery of materials, is also an object of this invention.

These and other objects and advantages of this invention will become more readily apparent from the following detailed description and accompanying drawings in which.

Figure 1:
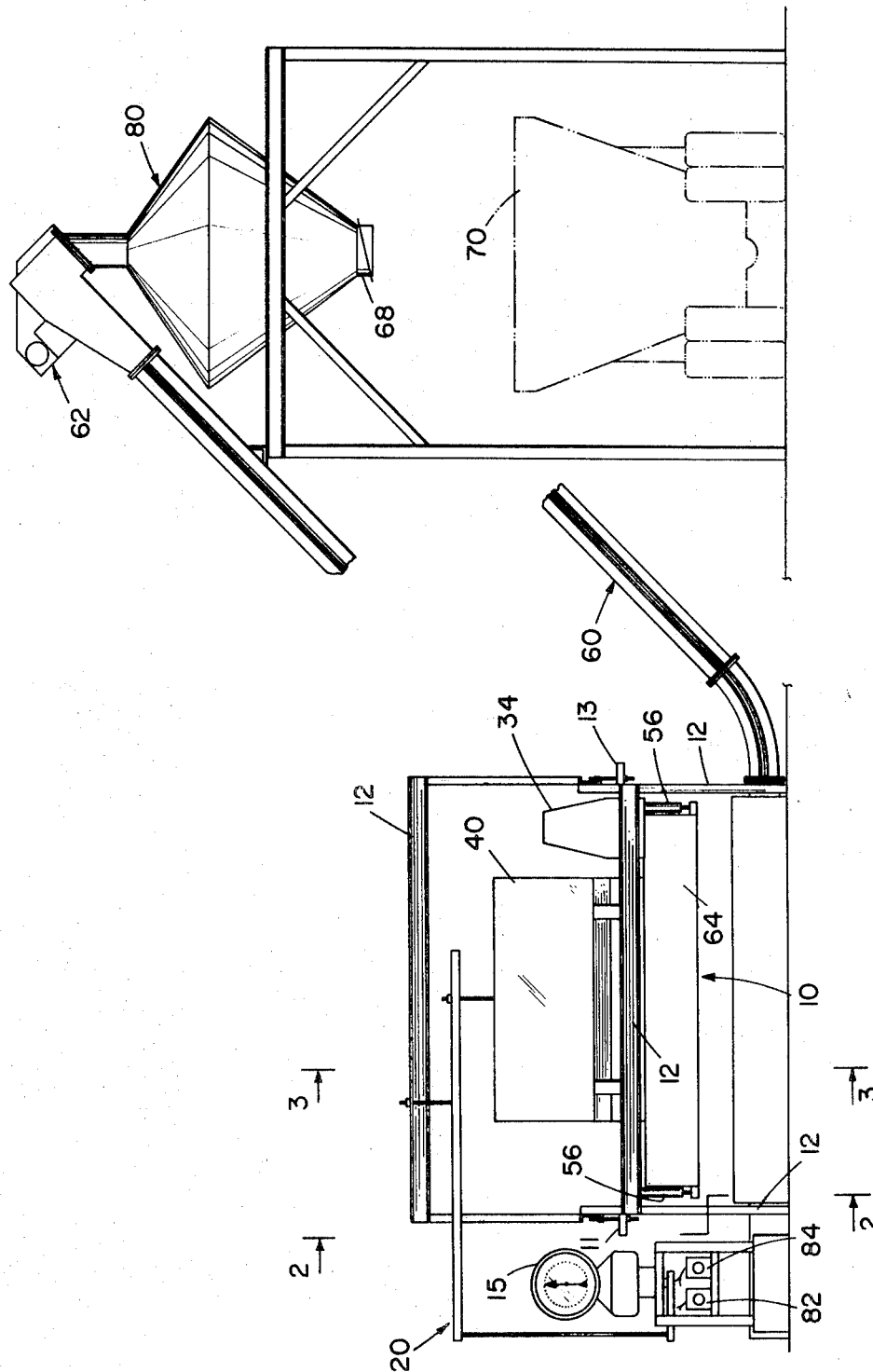
FIG. 1 is a side elevation of a high speed blending and loading system incorporating features of this invention.
Figure 3:
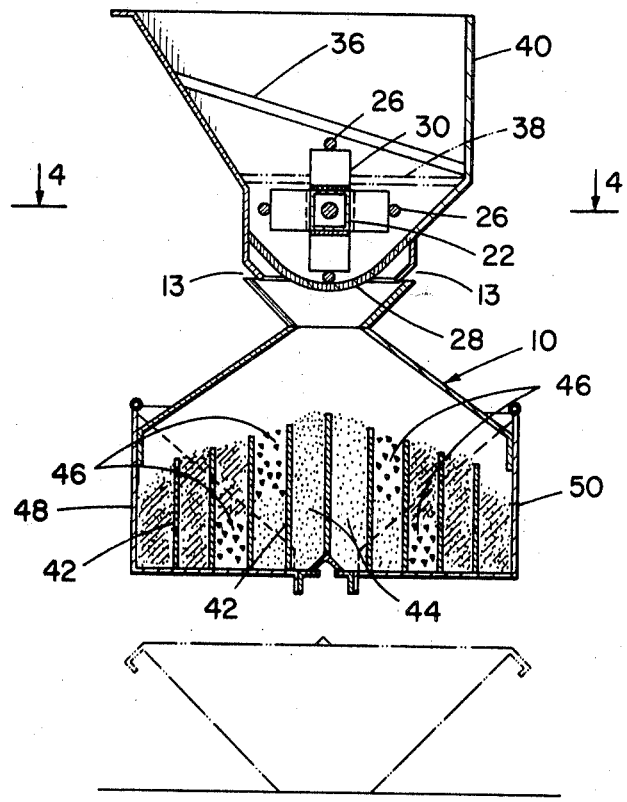
FIG. 3 is a cross section taken along line 3—3 of FIG. 1, with frame and scale system not being shown for clarity.
Figure 5:
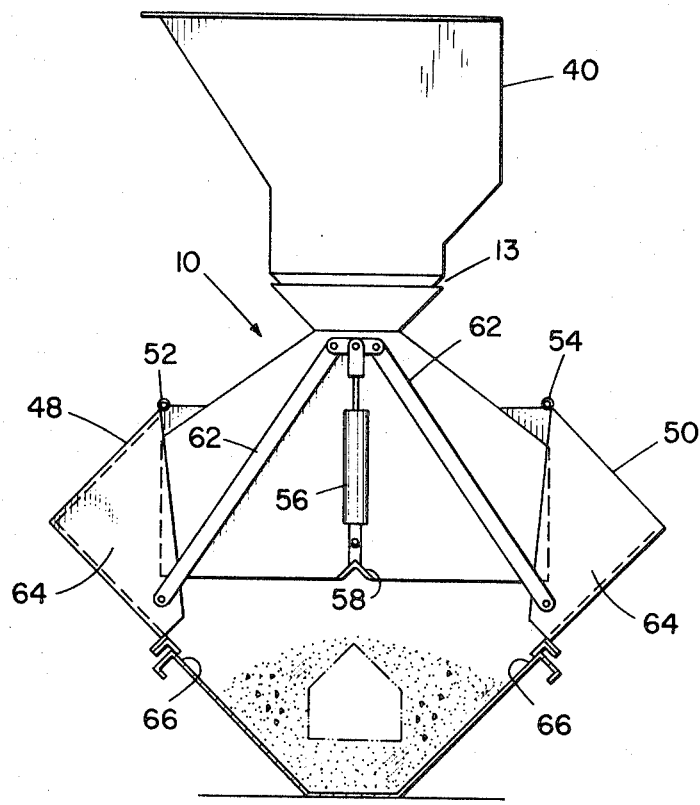
FIG. 5 is a view similar to FIG. 2 showing the doors of the primary hopper open, with frame and scale system not being shown for clarity.

Referring now to FIGS. 1, 3, and 5 of the drawings, the system for high speed blending, conveying, and loading of materials consists of a material conditioning and loading chute 40, a primary weigh-blend hopper 10, a conveyor unit 60, and a final weigh-blend hopper 80.

Figure 2:
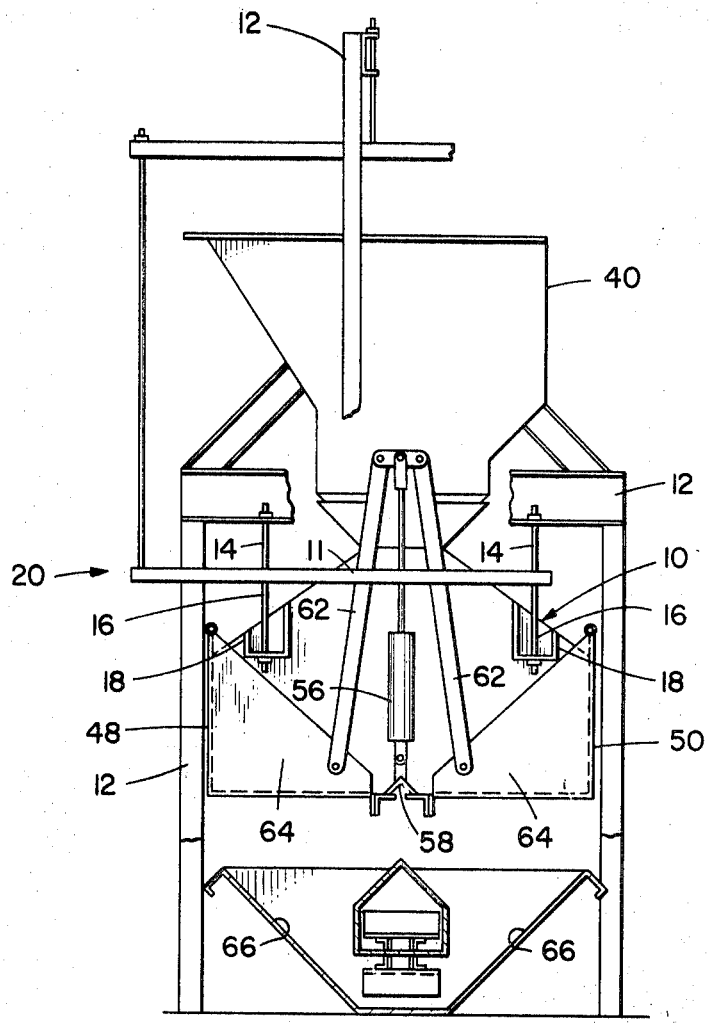
FIG. 2 is a cross section taken along line 2—2 of FIG. 1.
Figure 4:
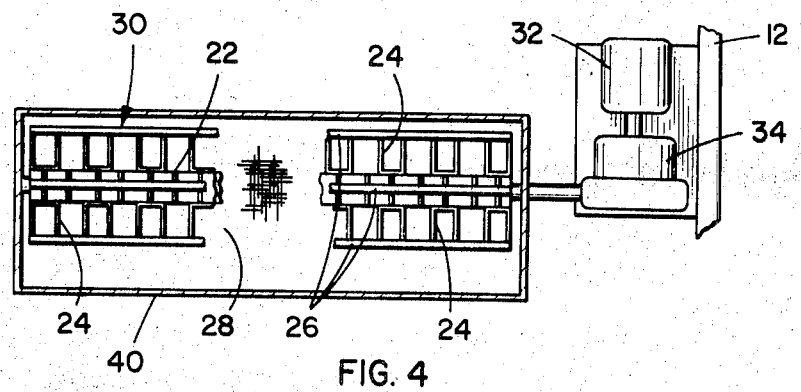
FIG. 4 is a cross section taken along line 4—4 of FIG. 3.

The material conditioning load chute 40, as best shown in FIGS. 1, 2, and 4, is positioned above the primary weigh-blend hopper 10 to receive one or more raw materials charged thereto by a payloader, from existing overhead bins, or from a conveyor system. Chute 40 is rigidly mounted to a frame 12 of the hopper 10, and it is spaced from the hopper 10 by a gap 13. This gap 13 prevents damage to a suspended weighing scale system 20 by any loading means, such as a payloader, coming into contact with the hopper chute 40.

Chute 40 has mounted therein a rotary crusher 30 for conditioning of lump formations of raw materials received in the chute 40. The rotary crusher 30 is mounted for rotation at opposite ends of the hopper chute 40 and it is rotated by a motor 32 coupled thereto through a gearbox 34 and shafting. Crusher 30 consists of a square tube frame 22 on which are mounted, at 90° intervals, U-shaped members 24—24 for the granulation and braking up of large lumps of raw materials received by chute 40 when it is charged with materials.

Located radially outwardly of the frame 22 of the rotary crusher 30 and spaced 90° apart are four round rods 26 which run the length of the hopper chute 40. These rods 26 are secured to the ends of the U-shaped members 24 by welding or the like, with the base of the "U" members 24 being secured to the square tube frame 22. The rods 26, upon rotation of the rotary crusher 30, come into contact with a filtering screen 28 positioned in the lower part of the chute 40 and further crush and pulverize any remaining lump material not broken up by the U-shaped members 24 upon rotation of the rotary crusher 30.

Hopper chute 40 is also provided with spaced guard members 36 which bridge the opening to the chute 40 to prevent damage by any loading device, such as a payloader. Hopper chute 40 could alternatively be provided with only a screen 38 (shown in phantom in FIG. 3) if no lumpy materials were present.

Figure 8:
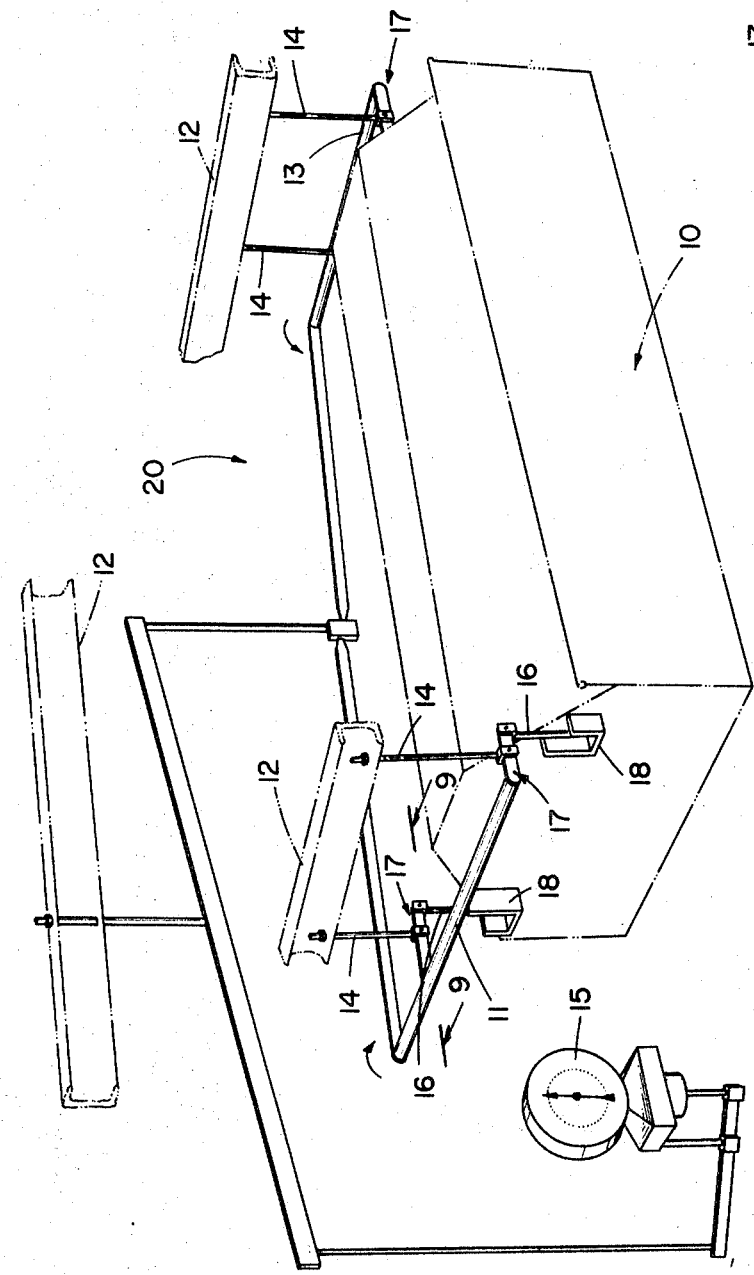
FIG. 8 is a perspective view of the suspended scale system.
Figure 9:
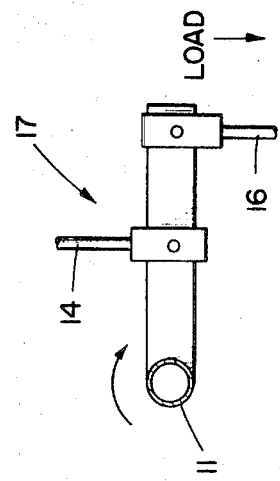
FIG. 9 is a cross section taken along line 9—9 of FIG. 8.

The primary weigh-blend hopper 10, as shown in FIGS. 1, 2, 3, and 5, is suspended from the frame 12 of the hopper 10 by four sets of rods 14 and 16 whose ends are attached to a suspended scale system 20, best shown in FIGS. 1, 8, and 9 in which a mechanical linkage 17 transmits the weight of the hopper 10 into torque on torsion bars 11 and 13, after which a combination of scale type linkages pass the force of the weight to a scale 15. The lower ends of the rods 16 are attached to the hopper 10 by four clips 18 located adjacent to the corners of the hopper 10, as shown in FIGS. 2 and 8.

The weigh-blend hopper 10, as best shown in FIG. 3, is located under the chute 40, and it is divided by a series of partitions 42 to cause a vertical layering of materials which is desirable when mixing of more than one material or ingredient is necessary, such as a plant food. For example, as shown in FIG. 3, a first material 44 loaded through the hopper chute 40 may fill the center two compartments of the hopper 10 and overflow into the two adjacent compartments and occupy the lower portion of these compartments. This material 44 is weighed by use of the scale system 20. Upon adding a second material or ingredient 46 to the hopper 10, which is sequentially weighed by scale system 20, since the center two compartments have been previously filled, the second material or ingredient would occupy the remaining portion of the center adjacent compartments and then overflow to the next outwardly adjacent unfilled compartments and so on.

The hopper 10 is provided with two hinged doors or gates 48 and 50, pivoting at piano type hinges 52 and 54, which enclose the sides and bottom of the hopper 10 when it is closed.

Figure 6:
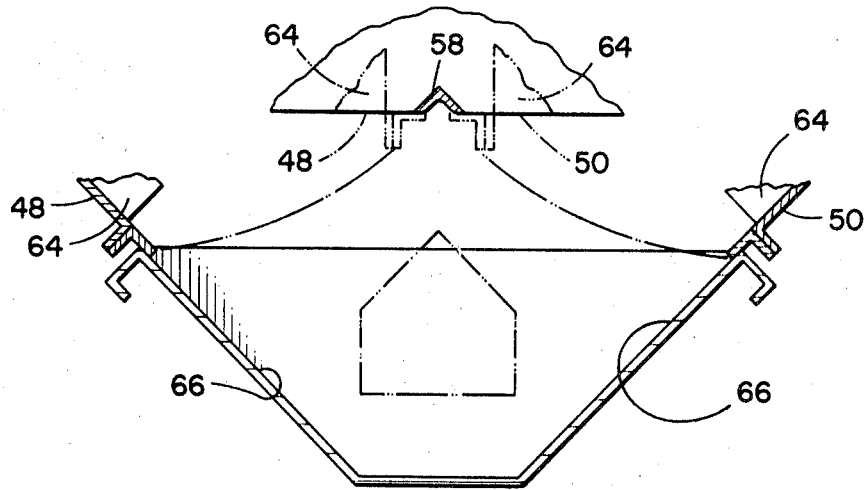
FIG. 6 is a view showing a portion of FIG. 5 enlarged for clarity.

When the doors 48 and 50 are closed, their edges overlap the angle member 58 to seal off the hopper 10 so that the raw materials loaded therein from the chute 40 will not leak from hopper 10, as shown in phantom in FIG. 6.

These doors 48 and 50 are opened by cylinders 56—56 one at each end of the hopper 10, as shown in FIGS. 1, 2, and 5. The cylinders 56—56 are fixed to an angle member 58 which runs the length of the hopper 10 and extends a short distance from its ends.

Arms 62—62 are pivotally mounted to tabs 64—64 of each door 48 and 50 at one of their ends and pivotally attached to the ram of the cylinder 56 at the other end.

When the doors 48 and 50 are open as illustrated in FIG. 5, they form an overlapping and equally inclined surface with a conveyor unit hopper 66 located below hopper 10, as best shown in FIG. 6. The clearance necessary to open and close the doors 48 and 50 is minimal and allows a very low profile unlike other such units. Upon opening of the doors 48 and 50, the material in the hopper 10 is further blended as it falls to the hopper 66 located therebelow.

After the blended material is deposited into the hopper for the conveyor 60, it is conveyed up an incline of approximately 45° where further mixing and blending of the material occurs because the angle of repose of the material is approximately 32° until it is deposited into a final blend hopper 80, shown in FIG. 1. Here, the material is again vertically layered by interior partitions shaped much like the frustum of a cone as shown in in u.S. Pat. No. 3,068,076, entitled "Materials Handling System," issued to Walter J. Sackett, Sr. on Dec. 11, 1962. The material can now be metered by valve 68, shown in FIG. 1, into any transporting method, one of which is shown in phantom, namely truck 70, or it can be bagged.

Figure 7:
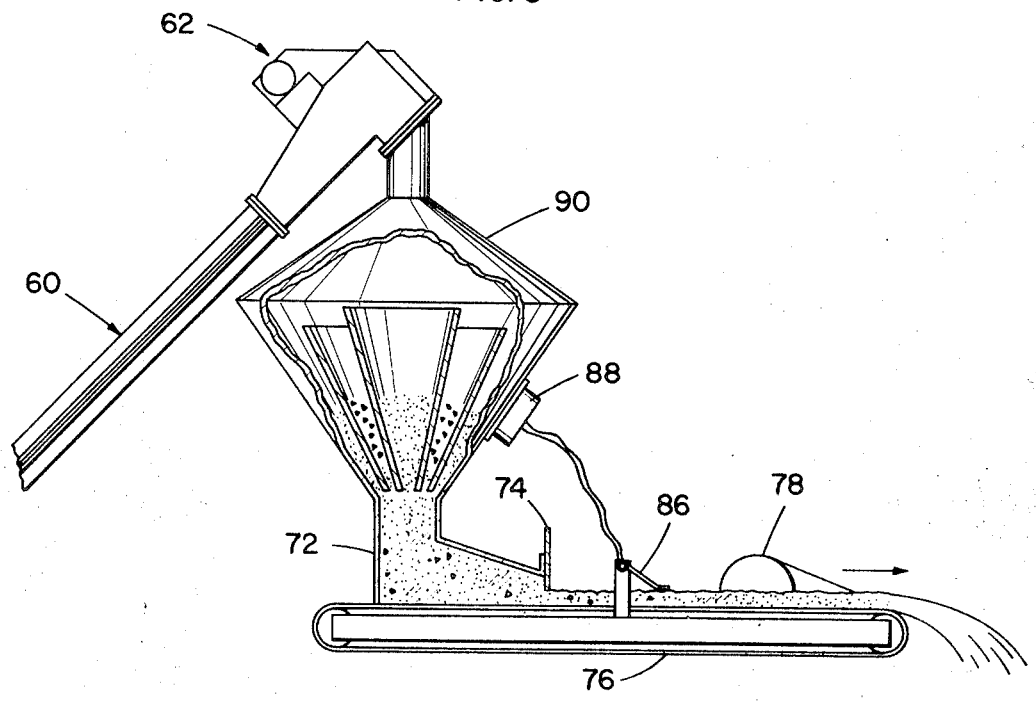
FIG. 7 is a view, partly in cross section of a modified loading system.

However, if it is desired to have a constant volume of blended material deposited into some auxiliary mixing area, a final blend hopper unit 90, shown in FIG. 7, would be employed. This hopper 90 has at its lower portion an enclosure 72. The enclosure 72 has a manual operated adjustable gate 74 provided at its discharge end, with an endless conveyor belt 76 providing the bottom of the enclosure 72. The conveyor 76 is driven by a variable speed drive 78.

Referring now back to the weigh-blend hopper 10 shown in FIG. 1, two timers 82 and 84 are shown located on a frame. One of these timers, say timer 82, is used to open the doors or gates 48 and 50 of the primary weigh-blend hopper 10 at precise preset intervals of time and the timer 84 is used to close the doors 48 and 50 of the hopper 10 at precise preset intervals of time. The combined use of the timers 82 and 84, the variable drive 78, and the manual adjustable gate 74, allow constant volumes of blended material to be delivered to a predetermined area for further processing.

In the event the feeler switch 86 in FIG. 7, which rides the surface of material, drops to a lower position, indicating possible "Bridging" of material in hopper 90, a signal is set to a vibrator 88 mounted on the exterior of the hopper 90 to break up the "Bridging" of material.

Obviously many modifications and variations of the present invention are possible in light of the above teachings. It is, therefore, to be understood that within the scope of the appended claims the invention may be practiced otherwise than as specifically described.

What is claimed is:

1. A high speed blending and loading system, comprising, a primary weigh-blend hopper means having a hopper of substantially rectangular shape formed of two pivotally mounted gates defining the sides and bottom of said hopper where said gates are closed, said hopper being provided with spaced partitions running lengthwise thereof defining chambers therebetween for successively receiving materials, fulcrum means for supporting said weigh-blend hopper means, a weighing system mechanically coupled to said fulcrum means for continuously weighing the materials in said weigh-blend hopper means, a conveyor system having a hopper located below said weigh-blend hopper for receiving the materials from said weigh-blend hopper upon opening of said gates, with said materials being blended by gravity as they fall to said conveyor hopper, and blending hopper means positioned to receive the blended material conveyed by said conveyor means for further blending and holding thereof and for further processing.

2. A high speed blending and loading system as recited in claim 1, and additionally a chute positioned at the top of said primary weigh-blend hopper means for receiving the materials to be blended.

3. A high speed blending and loading system as recited in claim 2, and means positioned in said chute for conditioning of the received materials.

4. A high speed blending and loading system as recited in claim 2, wherein said means in said chute for conditioning of said received materials consists of a rotary crusher having spaced elements thereon for conditioning of received materials as it rotates.

5. A high speed blending and loading system as recited in claim 1, and additionally means for opening and closing said gates forming said weigh-blend hopper.

6. A high speed blending and loading system as recited in claim 1, wherein said gates, when open, form a continuation of the sides of said conveyor hopper.

7. A high speed blending and loading system as recited in claim 1, wherein said blending hopper means includes a plurality of coaxially arranged inverted truncated shaped cones defining chambers therebetween for receiving said blended materials from said conveyor system for further blending thereof.

8. A high speed blending and loading system as recited in claim 1, and means for metering of said blending hopper means for further processing thereof.

9. A high speed blending and loading system as recited in claim 1, wherein said blending hopper means is open at the discharge end thereof, a second conveyor system for continuously receiving and conveying the blended materials received from said blending hopper means.

10. A high speed blending and loading system as recited in claim 9, and means positioned at the discharge end of said blending hopper means for directing said discharged materials to said second conveyor system.

11. A high speed blending and loading system as recited in claim 9, and means for vibrating said blending hopper means.